United States Patent [19]
Davidson et al.

[11] Patent Number: 5,203,578
[45] Date of Patent: Apr. 20, 1993

[54] SHOPPING CART AND CONTAINER APPARATUS

[75] Inventors: Michael B. Davidson; Joseph P. Jackman; Cameron G. Whitworth; Harold Braul, all of Toronto, Canada

[73] Assignee: In-Store Products Limited, Ontario, Canada

[21] Appl. No.: 790,056

[22] Filed: Nov. 12, 1991

[51] Int. Cl.⁵ .............................................. B62D 39/00
[52] U.S. Cl. .................................. 280/33.991; 206/509; 206/512; 220/23.83; 280/33.997; 280/47.35; 280/79.3
[58] Field of Search ............. 280/33.991, 47.19, 47.35, 280/33.997, 33.995, 79.2, 79.3, 79.1; 206/509, 512; 220/23.83

[56] References Cited

U.S. PATENT DOCUMENTS

| | | | |
|---|---|---|---|
| D. 197,311 | 1/1964 | Spaak et al. | 206/509 |
| D. 310,748 | 9/1990 | Embree et al. | D 34/40 |
| 2,133,834 | 10/1938 | Sheldon | 280/33.995 |
| 2,141,881 | 12/1938 | Schray | 280/47.35 |
| 2,615,726 | 10/1952 | Brottman | 280/47.35 |
| 2,687,589 | 8/1954 | Brockway | 40/28 |
| 2,995,271 | 8/1961 | Frater et al. | 220/97 |
| 3,121,496 | 2/1964 | Brunette | 280/33.991 |
| 3,420,402 | 1/1969 | Frater et al. | 220/97 |
| 3,614,133 | 10/1971 | Ganci et al. | 280/33.991 |
| 3,721,349 | 3/1973 | Jaffee et al. | 280/79.3 |
| 3,844,577 | 10/1974 | Wahl | 280/33.991 |
| 4,355,818 | 10/1982 | Watts | 280/654 |
| 4,746,134 | 5/1988 | Rehrig | 280/33.991 |
| 4,846,350 | 7/1989 | Sorensen | 206/520 |
| 4,848,580 | 7/1989 | Wise | 206/519 |

FOREIGN PATENT DOCUMENTS

| | | | |
|---|---|---|---|
| 382866 | 8/1990 | European Pat. Off. | 280/33.991 |
| 1163199 | 9/1958 | France | 280/33.995 |
| 2562019 | 10/1985 | France | 280/33.991 |
| 2569151 | 2/1986 | France | 280/47.35 |
| 2573378 | 5/1986 | France | 280/33.991 |
| 661981 | 11/1951 | United Kingdom | 280/33.995 |

*Primary Examiner*—Eric D. Culbreth

[57] ABSTRACT

A shopping cart and container apparatus for transporting grocery products in or about a store from a supermarket or the like, includes a plurality of containers and a cart for transporting the containers. The cart comprises an elongated wheeled base, a frame extending upwardly from the base, and at least one rack carried by the frame which includes a shelf for supporting at least one of the containers. A securing device, such as a pair of pins extending generally upwardly from the rack, releaseably secures the containers to the shelf. The cart preferably comprises an upper rack and a lower rack separated by a distance greater than the height of the containers. The containers preferably include a laterally outwardly extending lip which has apertures therein for mating with the pins.

26 Claims, 6 Drawing Sheets

SHOPPING CART AND CONTAINER APPARATUS

BACKGROUND OF THE INVENTION

The present invention relates to shopping cart and container apparatus for transporting groceries within or to and from a supermarket or the like.

Traditionally, customers have used shopping carts comprising a relatively deep wire basket on a wheeled frame to convey groceries from their location on self-serve shelves in a supermarket to a check-out station. Once the customer arrives at the check-out station, the groceries are unloaded from the shopping cart by the customer onto a conveyor belt. The groceries are then typically passed over a bar code scanner or weighed by a cashier, and placed onto a receiving table. The groceries are then loaded into paper or plastic bags by the cashier, or alternatively "bagged" by the customer or a bag boy. The bags of groceries are then usually placed back into the shopping cart, and the shopping cart is pushed by the customer or the bag boy to the shopper's vehicle, and the bags of groceries are unloaded from the cart into the vehicle. The bags of groceries are then unloaded from the customer's vehicle and carried into the customer's premises.

The use of a traditional shopping cart in combination with plastic or paper bags as described above entails a number of inconveniences. In the case of shopping carts having relatively deep wire baskets, occasionally softer grocery items placed near the bottom of the baskets are crushed or otherwise damaged by heavier items placed thereon. Having to unload the grocery items one-by-one from the basket onto the check-out belt is a time consuming process, and often the cashier begins ringing up the customer's order before the customer finishes his unloading task, leaving the customer no opportunity to observe the cashier. Sometimes an experienced cashier is able to organize the groceries to some extent as they are being bagged, but often the groceries are placed into bags in an unorganized fashion. Further, when the bags of groceries are loaded into or unloaded from the customer's vehicle, the bags of groceries from time to time tip over or rip, spilling their contents. And from the store's point of view, providing an endless supply of plastic or paper bags is costly and detrimental to the environment.

SUMMARY OF THE INVENTION

The present invention is an improved shopping cart and container system for transporting merchandise such as groceries in or about a store, which overcomes many of the disdavantages of the prior art. The subject system comprises a plurality of containers, and a shopping cart having an elongated wheeled base, a frame extending upwardly from the base, a handle coupled to the frame for pushing the cart, at least one rack carried by the frame, the rack including shelving means for supporting at least one of the containers, and securing means for releasably securing the containers to the shelf.

In a preferred embodiment, the shopping cart includes two vertically spaced racks separated by a distance greater than the height of the containers. The securing means preferably comprises at least one projection or pin extending generally upwardly from each rack and at least one aperture in a lip or rim of the container dimensioned to mate with the pin. The securing means also preferably comprises at least one lug spaced from the pin and extending upwardly from the shelving means, and an aperture or cavity in the bottom of the container dimensioned to mate with the lug.

The securing means may comprise a pair of spaced pins and a pair of lugs spaced forwardly from the pins and extending upwardly from each rack, and a number of mating apertures in the containers. Preferably, the lip of each container is provided with a pair of spaced end wall apertures each dimensioned to mate with one of the pins, a pair of side wall apertures spaced apart so as to fit over the pair of pins when the container is placed sidewise on the shelving means, and a pair of bottom apertures symmetrically offset from the center of the container such that one of the bottom apertures mates with one of the lugs when a container is placed lengthwise on the shelving means. This structure allows two containers to be placed lengthwise side-by-side on the shelving means and releasably secured thereto, each being secured by one of the pins and one of the lugs. Alternatively, one container may be placed sideways on the shelving means and releasably secured thereto by the pair of pins.

DESCRIPTION OF THE PREFERRED EMBODIMENT

Figure 1:
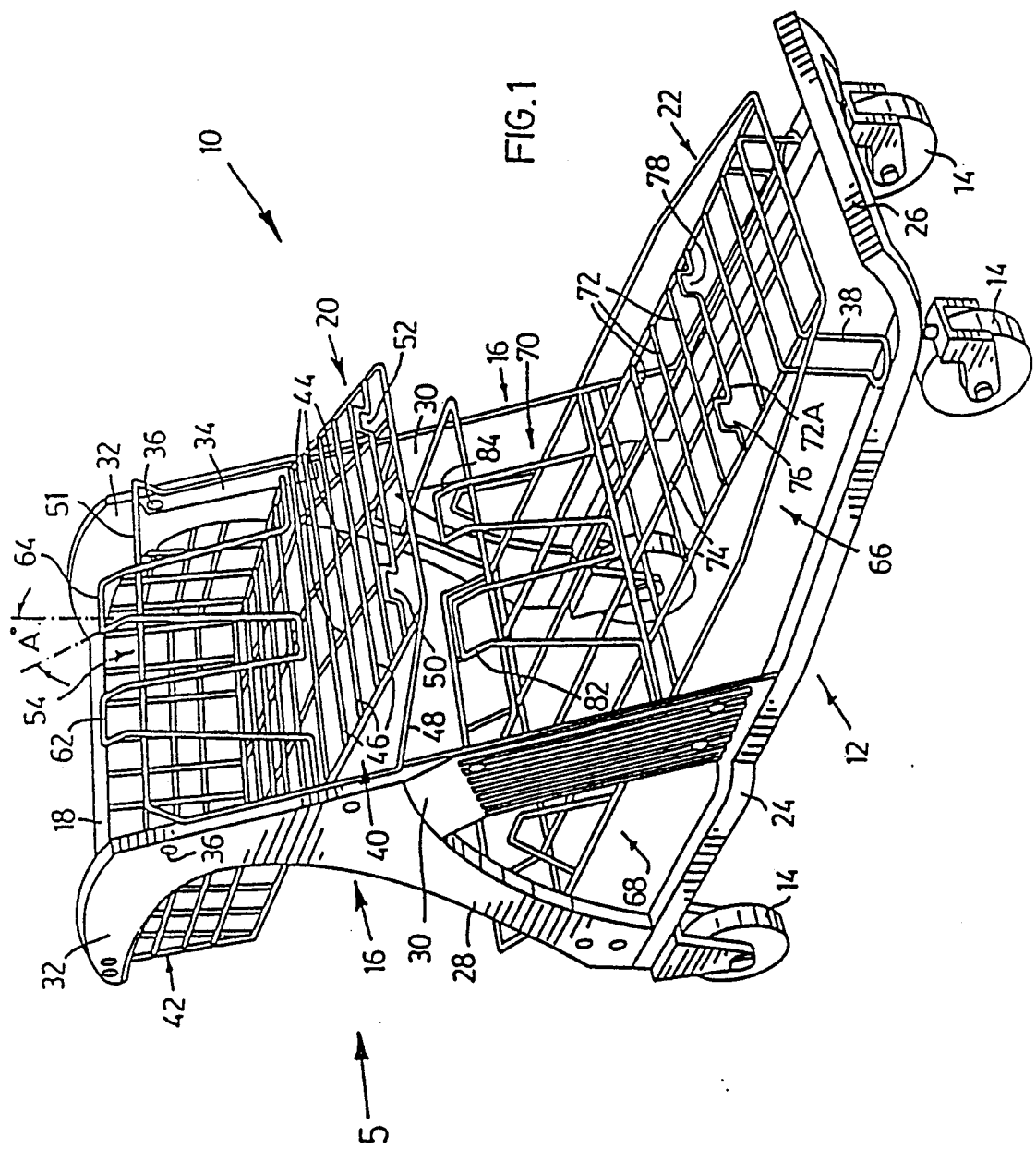
FIG. 1 is a perspective view of a preferred embodiment of the shopping cart of the present invention.

Referring first to FIG. 1, the shopping cart and container apparatus of the present invention comprises a shopping cart shown generally as 10, comprising a base 12 having standard cart wheel assemblies 14 mounted at each corner thereof, a pair of side frames 16, a handle 18 extending between side frames 16 at the top rear portion thereof, upper wire rack 20 and lower wire rack 22.

Base 12 comprises longitudinal base members 24 coupled together at their front by transverse base member 26. Side frames 16 preferably take the form of an upside-down lower case "y" having a shorter frame member 28 extending angularly upwardly and forwardly from the rear of longitudinal base member 24 and a longer frame member 30 extending angularly upwardly and rearwardly from about the middle of longitudinal base member 24. Longer frame members 30 each include a backwardly curved top portion 32, coupled together by handle 18 at the rear thereof. Base 12 is preferably constructed of one inch square tubing, and side frames 16 are preferably made of structural foam or molded plastic, although other types of materials may be used.

Upper rack 20 is coupled to side frames 16 by means of side mounting brackets 34 and nuts and bolts 36. Lower rack 22 is coupled to side frames 16 by means of suitable brackets and fasteners. The front of lower rack 22 includes feet portions 38 which rest on longitudinal base members 24. Racks 20, 22 are preferably made from a lattice-work of heavy gauge wire.

Upper rack 20 comprises upper container shelf 40 extending forwardly from frame members 30 in a generally horizontal slightly downwardly inclined plane, and a rear babyseat 42 which may be used to carry a young child or individual grocery items. Container shelf 40 comprises a matrix or lattice-work of intersecting longitudinal extending wires 44 and transverse wires 46. Container shelf 40 is supported by angular support arms 48 attached to frame members 30. A forward one of transverse wires 46 includes a pair of upwardly extending locking lugs 50, 52. Upper rack 20 also comprises partition 54 which separates babyseat 42 from upper container shelf 40. Partition 54 comprises transverse bar 51 extending between side frame members 30 and a pair of generally vertical locking projections or pins 62, 64, which are preferably formed from inverted U-shaped loops of wire extending upwardly from the floor of container shelf 40. Locking pins 62, 64 are preferably slanted backwardly at an angle A of about 5° to the vertical.

Lower rack 22 comprises lower container shelf 66 extending forwardly from frame members 30 in a generally horizontal, slightly downwardly inclined plane, and a rear bulk food item basket 68, separated from lower container shelf 66 by partition 70. Lower container shelf 66 is similar to upper container shelf 40, in that it is made of a lattice-work of transversely extending wires 72 and intersecting longitudinally extending wires 74. Transverse wire 72A comprises locking lugs 76, 78, which preferably take the form of upwardly extending looped portions of wire 72A. Partition 70 is similar to partition 54, and includes a transverse bar extending between frame members 30 and a pair spaced generally vertical locking pins 82, 84, which are preferably bent backwards at an angle of about 5° to the vertical.

Figure 2:
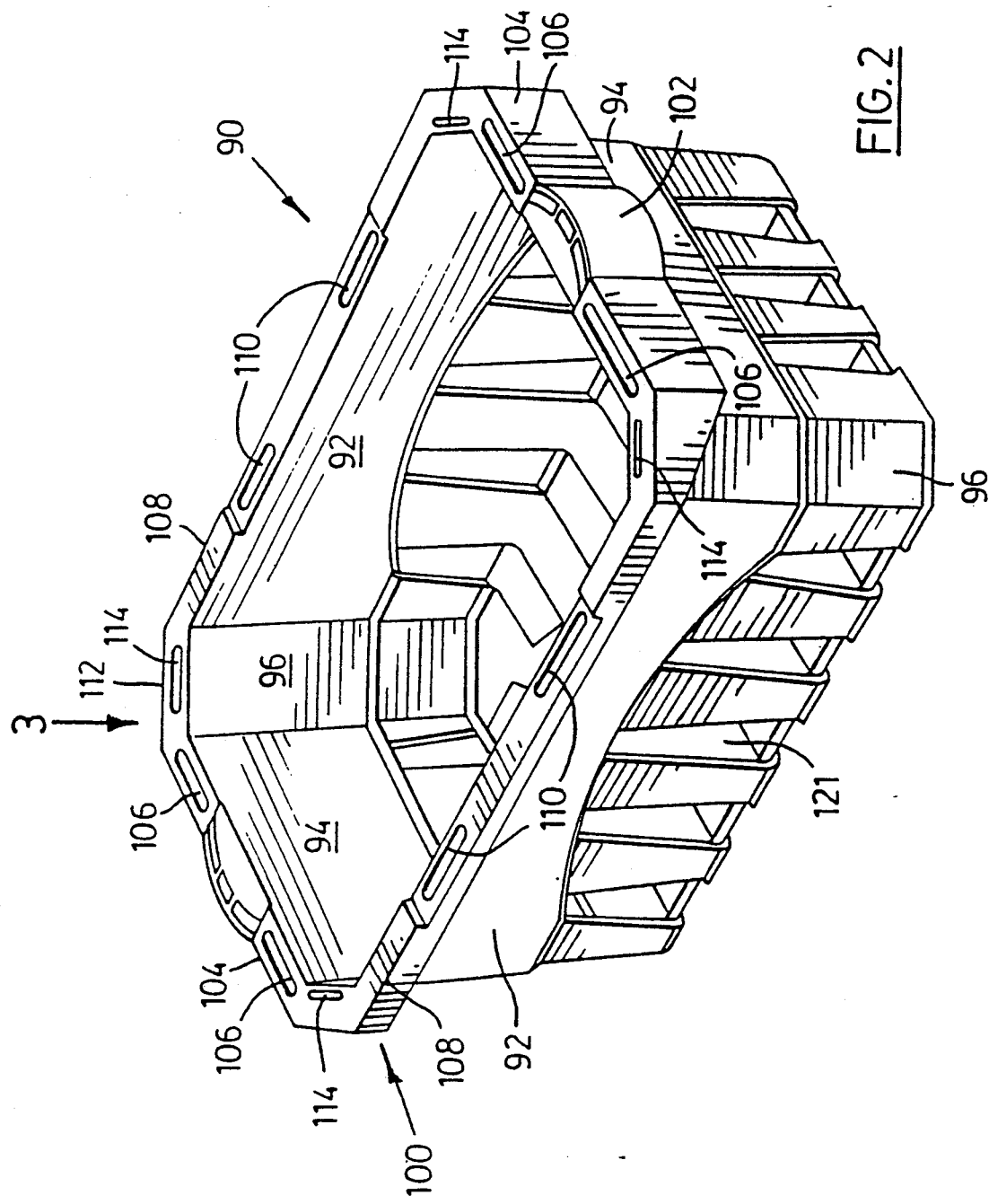
FIG. 2 is a perspective view of a preferred embodiment of the container of the present invention.
Figure 3:
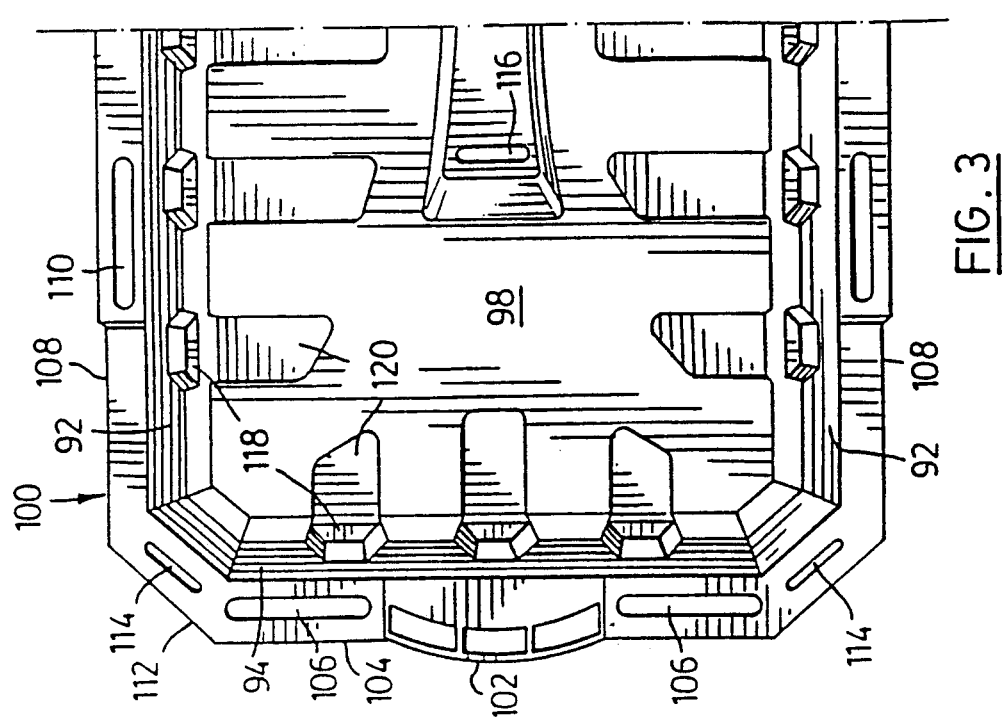
FIG. 3 is a half top plan view of the container shown in FIG. 2.

Referring now to FIGS. 2 and 3, the shopping cart and container apparatus of the present invention also comprises a plurality of merchandise containers 90, having a pair of opposed side walls 92, and a pair of opposed end walls 94 joined together to side walls 92 at angled corners 96. Side walls 92 and end walls 94 extend generally upwardly and outwardly from bottom 98. Circumferential rim or lip 100 extends laterally outwardly from the top of side walls 92 and end walls 94. Containers 90 are preferably rectangular, having a width defined by the length of end walls 94 and a length defined by the length of side walls 92. Containers 90 are preferably constructed of high impact plastic or the like.

Lip 100 comprises lip end portions 104 extending laterally outwardly from the tops of end walls 94. Lip end portions 104 each include a handle portion 102 having a conformed bottom gripping surface, and a pair of end apertures 106 centered around handle portion 102. Apertures 106 are spaced apart and dimensioned so as to mate with locking pins 62, 64 on upper shelf 40 or locking pins 82, 84 on lower shelf 66. The distance between end apertures 106 is preferably selected to be equal to the distance between locking pins 62, 64 or locking pins 82, 84, to enable a pair of end appertures 106 to mate with a pair of locking pins.

Container lip 100 also comprises lip side portions 108, extending laterally outwardly from the tops of side walls 92. Lip side portions 108 each have a pair of side apertures 110, which are spaced apart and dimensioned to receive locking pins 62, 64 or locking pins 82, 84, when container 90 is placed sideways on upper shelf 40 or lower shelf 66.

Container lip 100 also comprises corner portions 112 extending laterally outwardly from the tops of corner portions 96, which have corner appertures 114 for receiving a handle strap (not shown).

Provided in bottom 98 of container 90 are a pair of bottom apertures 116 symmetrically spaced from the midpoint of the container to receive one of locking lugs 50, 52 when container 90 is mounted lengthwise on upper shelf 40, or to receive one of locking lugs 76, 78, when containers mounted lengthwise on lower shelf 66, as discussed below.

The bottom 98 and walls 92, 94 of container 90 are strengthened by means of reinforcement means 118 and 120. Cuts-outs 121 are provided in side walls 92 to save weight and for appearance. Side and end walls 92, 94 are slanted outwardly, to make containers 90 stackable and nestable.

Figure 4:
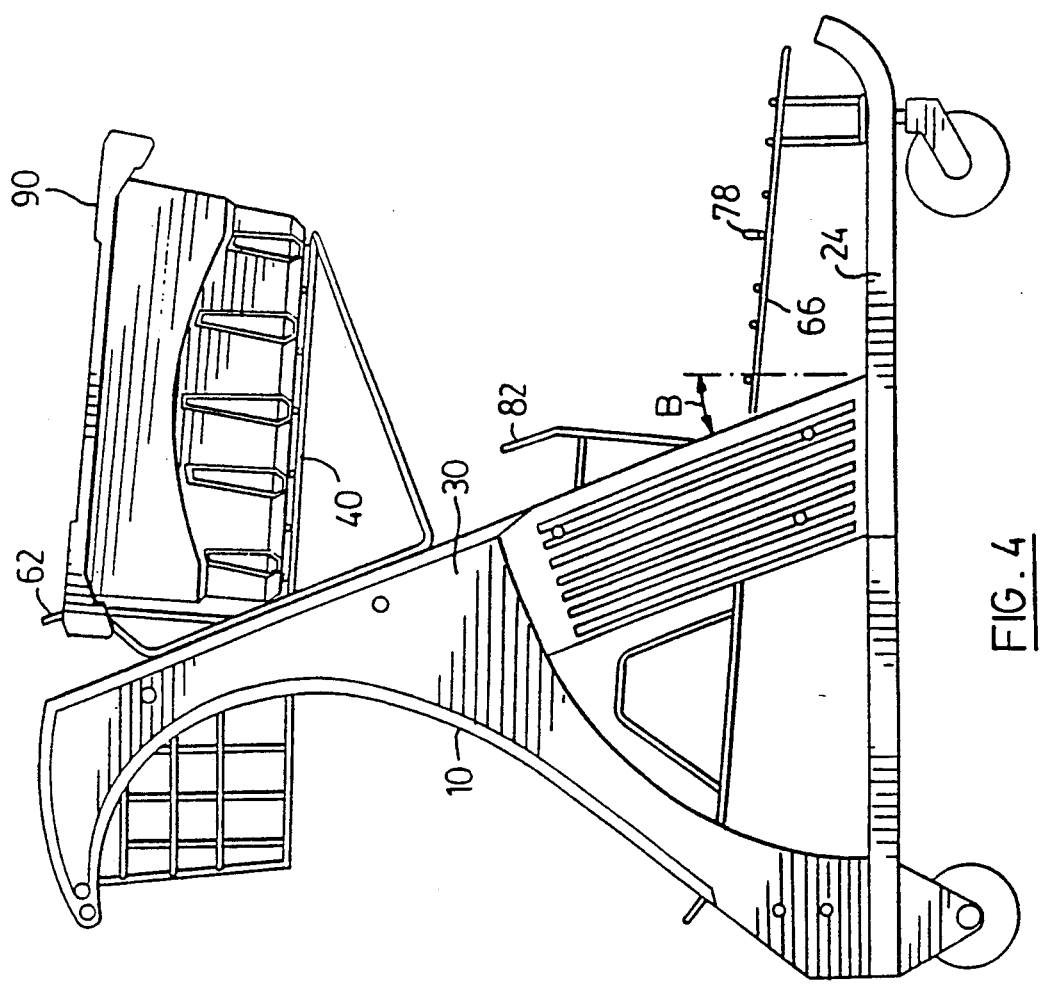
FIG. 4 a side elevational view of apparatus made in accordance with the present invention, showing the container mounted on the shopping cart.

Referring now to FIG. 4, there is illustrated therein a container 90 shown secured to upper shelf 40 of shopping cart 10 by the securing means of the present invention, comprising in this case locking pin 62 extending through one of end apertures 106 of container 90, and a locking lug engaging one of bottom apertures 116 of container 90. Alternatively, container 90 could be secured to lower shelf 66 by means of securing means comprising locking pin 82 and locking lug 78, and apertures 106, 116. Upper rack 40 is spaced far enough above lower rack 66 to enable container to be easily placed on and removed from lower rack 66.

The longitudinal axis of frame members 30 is slanted backwardly relative to longitudinal base members 24 at an angle B, and the length of upper shelf 40 is preferably less than the length of lower shelf 66. This construction results in upper shelf 40 being offset rearwardly from and not completely covering lower shelf 66, thus giving the shopper convenient access to lower shelf 66, for the purposes of loading grocery items into containers 90 secured on lower shelf 66, removing containers 90 from lower shelf 66, and so on.

Figure 5:
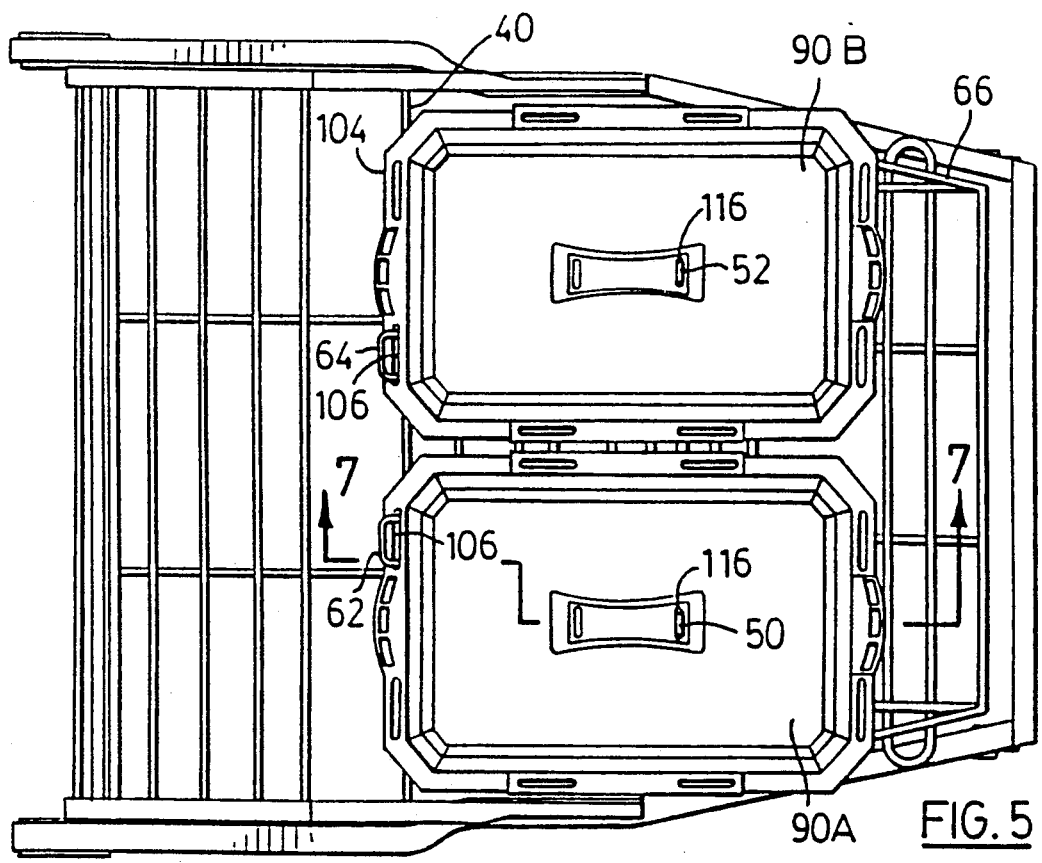
FIG. 5 is a top plan view of the shopping cart of the present invention, showing two containers of the present invention mounted lengthwise side-by-side on the top shelf thereof.
Figure 7:
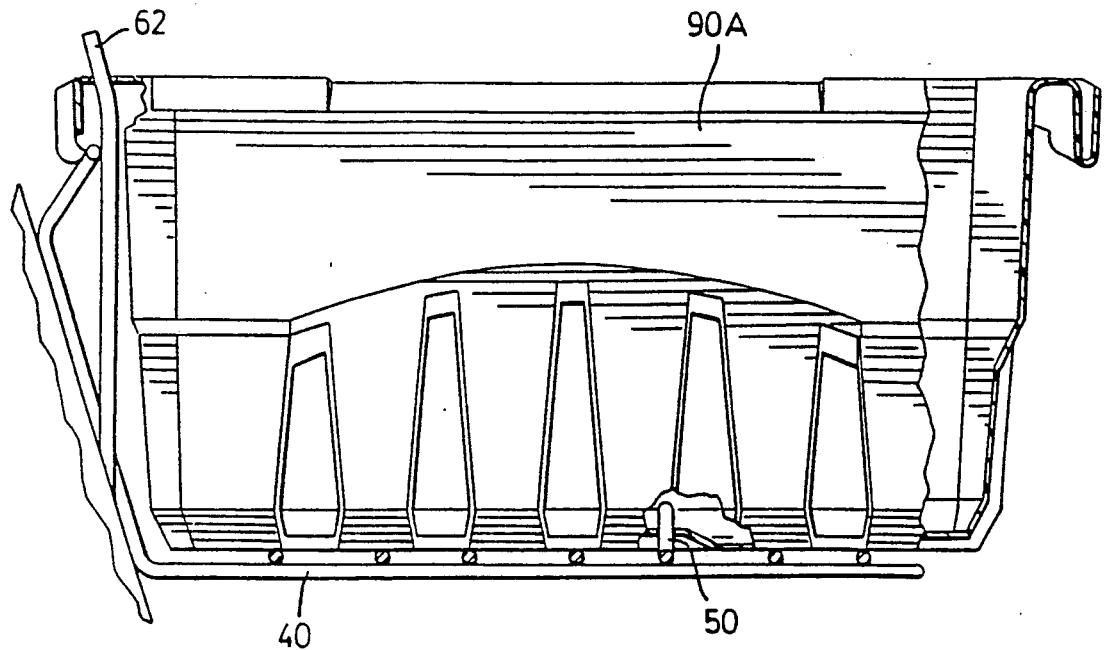
FIG. 7 is a staggered part sectional view of the container of the present invention shown mounted on the shopping cart, taken along line 7—7 in FIG. 5.

Referring now to FIGS. 5 and 7, the width of the containers 90 is selected to be narrow enough to enable two containers to be mounted lengthwise side-by-side on either upper shelf 40 or lower shelf 66. As shown in FIG. 5, containers 90A, 90B are secured to upper shelf 40 by placing them lengthwise side-by-side such that locking pin 62 extends through the inside end aperture 106 of container 90A and locking pin 64 extends through inside end aperture 106 of container 90B, and such that locking lug 50 registers with and extends through a bottom lug aperture 116 of container 90A, and lug 52 registers with and extends through a bottom lug apperture 116 of container 90B. Two additional containers may be secured to lower shelf 66 in a similar fashion.

Further, locking lugs 50, 52 are spaced far enough apart to allow a single container 90A or 90B to be mounted lengthwise on upper shelf 40, by engaging locking pins 62, 64 with a pair of apertures 106 within end wall lip 104 of container 90A or 90B.

Figure 6:
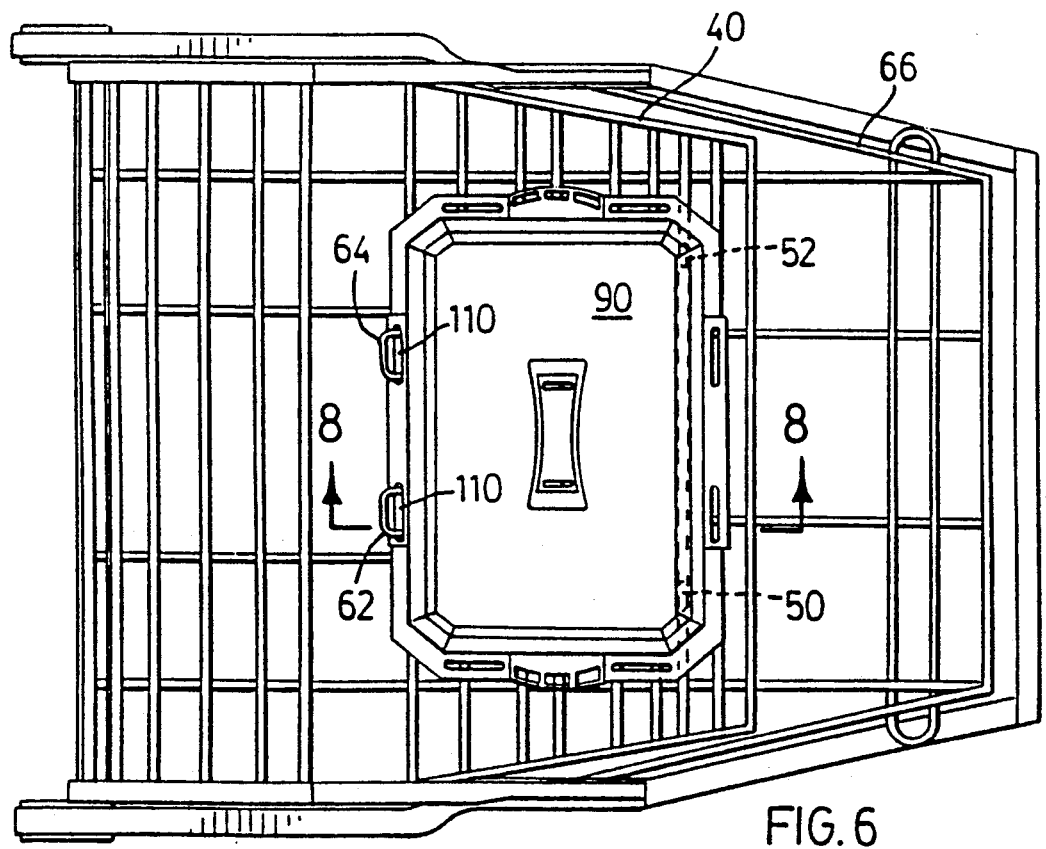
FIG. 6 is a top plan view of the shopping cart of the present invention, showing a single container of the present invention mounted sideways on the top shelf thereof.
Figure 8:
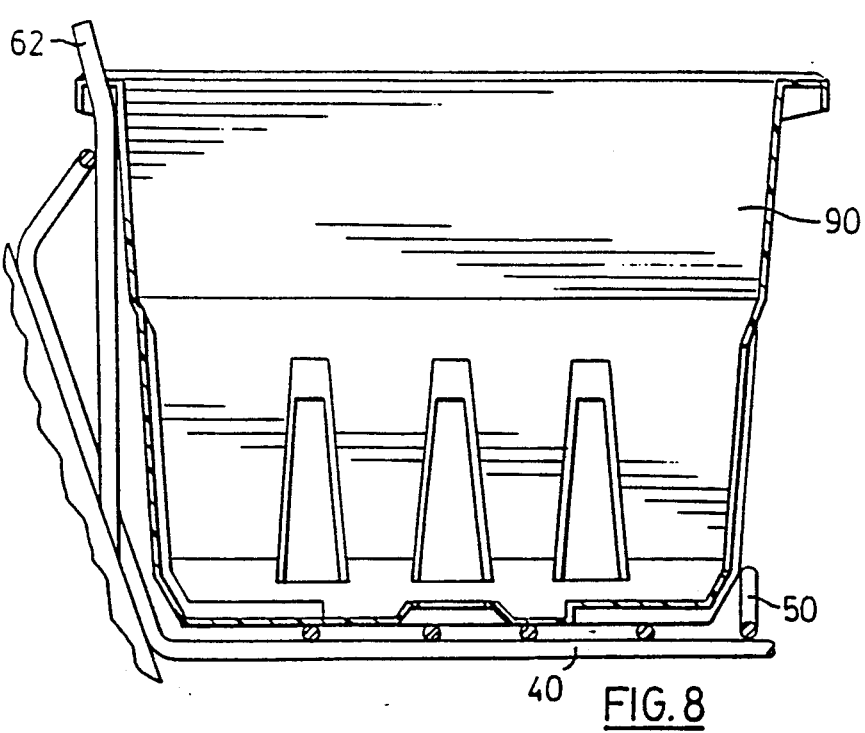
FIG. 8 is a sectional view of the container of the present invention shown mounted on the shopping cart, taken along line 8—8 in FIG. 6.

Alternatively, referring now to FIGS. 6 and 8, if a shopper wishes to mount only one container sideways on shopping cart 10, then container 90 may be secured to upper shelf 40 placing it sideways on shelf 40 in such a position that locking pins 62, 64 extend through side apertures 110 of container 90. The longitudinal distance between locking pins 62, 64 and locking lugs 50, 52 is selected to be greater than the width of container 90, such that when container 90 is mounted in the sideways or transverse position, locking lugs 50, 52 extend upwardly beyond the perimeter of container 90 and do not mate therewith.

Figure 9:
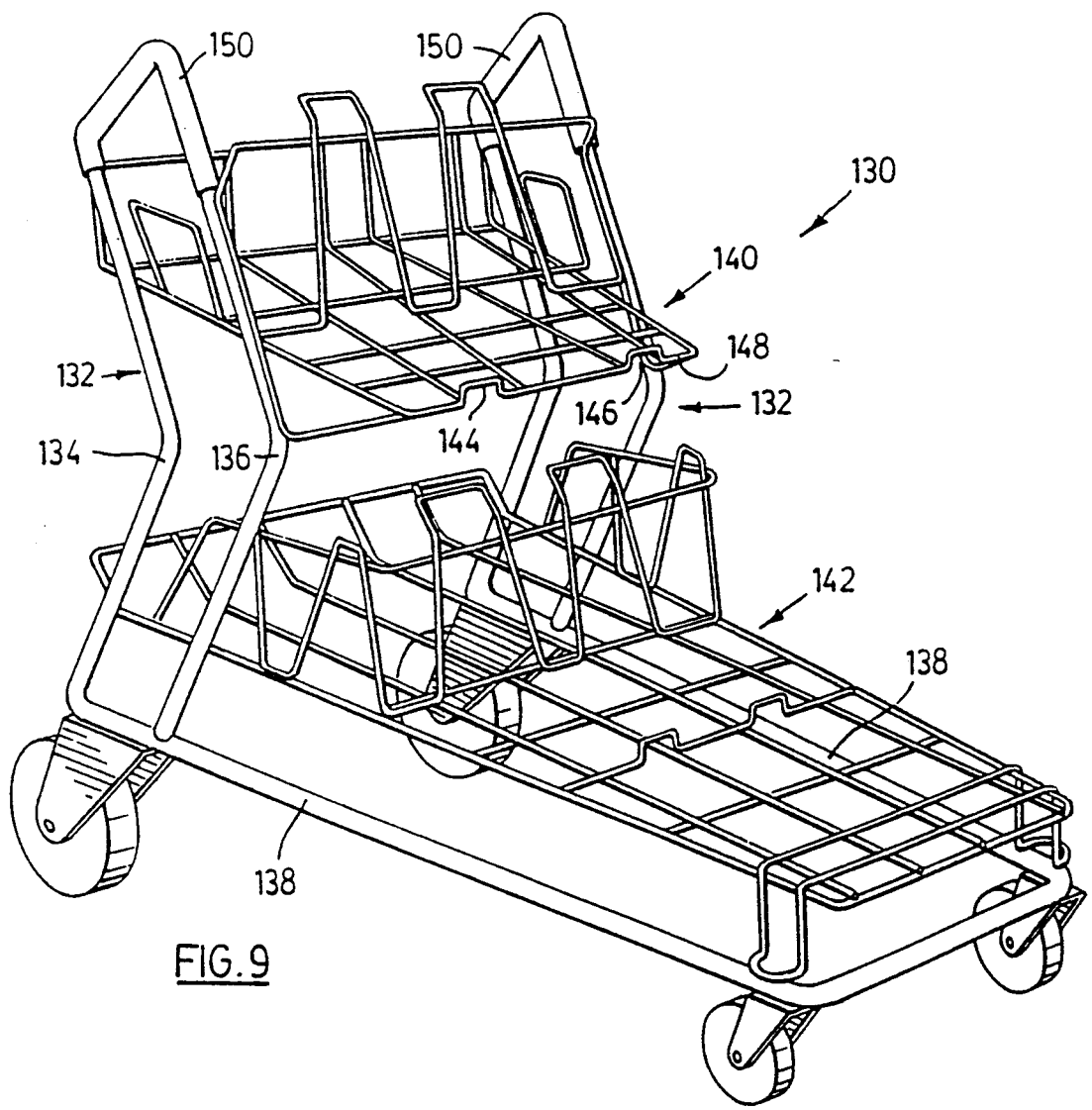
FIG. 9 is a perspective view of an alternative embodiment of the shopping cart of the present invention.

An alternative embodiment of the shopping cart of the present invention is shown in FIG. 9. Alternative shopping cart 130 is generally similar to shopping cart 10, although there are a few differences. Side frame 132 comprise a pair of spaced apart frame members 134, 136, bent into a "V"-shape. The bottoms of frame members 134, 136 are coupled to the rear of longitudinal base members 138. Frame members 134, 136 are preferably pieces of square tubing. Racks 140, 142 are somewhat narrower than racks 40, 66 of shopping cart 10. Upper rack 140 is shorter than upper rack 40, and lugs 144, 146 extend from front transverse wire 148 of upper rack 140. The handle means of shopping cart 130 comprises a pair of handles 150.

The use of the subject shopping cart and container apparatus of the present invention will now be described. Shoppers interested in shopping at a supermarket or other store utilizing the shopping cart system of the subject invention, would typically purchase or rent up to 4 or 5 of the subject containers 90. The shoppers would then borrow a shopping cart 10, typically provided for customers' use by the supermarket, and secure containers 90 to the shopping cart 10, as follows. Containers 90 are loaded unto shelf 40, 66 by tipping the container of a 5° angle to the vertical and registering the appropriate apertures of containers 90 with the appropriate locking pins or lugs, and then lowering the container 90 so that it sits flat on the appropriate shelf 40 or 66. One or two containers may be secured lengthwise to either shelf by positioning them as shown in FIG. 5. If two containers are mounted in a side-by-side configuration, one end aperture 106 is mated with one of the locking pins 62, 64, and one of the bottom apertures 116 is mated with one of the locking lugs 50, 52. If the customer desires to use only one container, then such container can be secured to shopping cart 10 in one of several ways. The container can be secured lengthwise in the center of or to one or the other side of either the top shelf or the bottom shelf, as shown in FIG. 5. Alternatively, it can be secured sideways across top shelf 40 as shown in FIG. 6 or bottom shelf 66. In the latter "sideways" case, the box is secured by placing side apertures 110 over locking pins 62, 64, by tipping the container at the required 5° angle to the vertical, and then rotating the container downwardly such that it rests flatly on shelf 40. In either case, container 90 is effectively releasably secured to shelf 40 or shelf 66, by means of two points of securement between container 90 and shelf 40 or 66 of shopping cart 10.

Use of the shopping cart and container apparatus of the present invention will assist shoppers in organizing his or her groceries by providing plurality of containers or bins within which related grocery items may be placed. The use of a plurality of such containers, which are shallower than the deep baskets of typical shopping carts, should prevent or reduce damage to softer or more fragile grocery items, which sometimes results when a large number of grocery items are piled on top of one another. Furthermore, when the shopper reaches the check-out stand, he or she merely has to remove only a few containers, and place them on the check-out stand conveyor, rather than removing each grocery item on a one-by-one basis. This allows the shopper to monitor if desired the actions of the cashier.

To check out the merchandise being purchased by a shopper using the subject shopping cart and container apparatus, a cashier would typically place an empty container on the exit conveyor of the check-out stand, and then remove each item of merchandise from the shopper's container closest to the check-out stand, pass each item over a scanner, and then place the item into the container placed on the exit conveyor. When the first container on the entry conveyor is emptied, the now full container on the exit conveyor is removed and placed in the shopper's shopping cart, and the now empty first shopper's container is placed in its place, and the process is repeated.

As each container of checked-out grocery items or other merchandise is filled, it is re-secured on the shopping cart 10, as described above. When the shopper's order is fully processed, the shopper may transport his or her grocery items to a vehicle, by pushing the shopping cart having secured thereon the plurality of containers. The customer may then load the containers of grocery items into his or her vehicle, stacking them cross-wise if desired, without incurring any appreciable risk of the containers tipping over or ripping. Alternatively, if the shopper is not using a vehicle but travelling by foot, then the shopper can use the optional handle secured to corner apertures 112 of container 90 to carry his or her groceries home.

While what is shown and described herein constitutes preferred and alternative embodiments of the subject invention, it will be understood that various changes can be made to such embodiments without departing from the subject invention, the scope of which is defined in the appended claims.

We claim:

1. Shopping cart and container apparatus for transporting merchandise within and to and from a store, comprising:
    (a) a plurality of containers dimensioned for containing merchandise, wherein the containers comprise a bottom, two paris of opposed walls extending upwardly form the bottom to provide an open top, and a lip extending from the upper edges of the walls,
    (b) cart means for transporting the containers, comprising an elongated wheeled base, a frame extending upwardly form the base, handle means coupled to the frame for handling the cart, and at least one rack carried by the frame, the rack including shelving means extending laterally outwardly from the frame for supporting at least one of the containers at the bottom thereof,
    (c) securing means associated with the rack and containers for releasably securing the containers to the shelving means, wherein the securing means comprises at least one pin extending generally upwardly from the rack, and (d) wherein the securing means comprises at least one aperture in the lip of the container dimensioned to mate with the at least one pin.

2. The apparatus as defined in claim 4, wherein the rack comprises a lattice-work of wires and the pin is formed from an inverted U-shape piece of wire.

3. The apparatus as defined in claim 2, wherein the top of the pin is inclined towards the rear of the cart at a slight angle to the vertical.

4. The apparatus as defined in claim 3, wherein the rack is slightly downwardly inclined to the horizontal from the rear to the front of the cart, and the pin is inclined backwardly to be approximately vertical.

5. The apparatus as defined in claim 1, wherein the frame comprises two side frame members each joined to longitudinal side members of the base and coupled together at the tops thereof.

6. The apparatus as defined in claim 5, wherein each side frame takes the general form of an inverted lower case "y" having a longer member and shorter member, the longer member being attached at its bottom to a middle portion of the longitudinal side members of the base and extending angularly backwardly, the shorter member extending angularly forwardly from the rear of the longitudinal side members of the base to the middle portion of the longer member of the side frame.

7. The apparatus as defined in claim 1, wherein the at least one rack comprises an upper rack and a lower rack separated by a distance greater than the height of the containers.

8. The apparatus as defined in claim 7, wherein the shelving means comprises a portion of the upper rack and a portion of the lower rack extending in a generally horizontal, slightly downwardly inclined plane.

9. The apparatus as defined in claim 8, wherein the securing means comprises at least one pin extending generally upwardly from each rack.

10. The apparatus as defined in claim 9, wherein the length of the shelving means of the upper rack is selected such that the shelving means of the lower rack is partially unobscured by the upper rack when viewing the lower rack from above.

11. The apparatus as defined in claim 7, wherein the lower rack includes a bulk food basket separated from the shelving means by a partition.

12. The apparatus as defined in claim 7, wherein the lower rack includes a basket separated from the shelving means by a partition, and is dimensioned for carrying a child.

13. Shopping cart and container apparatus as defined in claim 1 wherein the lip of the container extends laterally outwardly from the upper edges of the walls.

14. Shopping cart and container apparatus as defined in claim 1 wherein the container is constructed of high impact plastic.

15. Shopping cart and container apparatus, for transporting merchandise within and to and from a store, comprising:

(a) a plurality of containers dimensioned for containing merchandise, wherein the containers comprise a bottom, two pairs of opposed walls extending upwardly from the bottom to provide an open top, and a lip extending laterally outwardly from the upper edges of the walls, (b) cart means for transporting the containers, comprising an elongated wheeled base, a frame extending upwardly from the base, handle means coupled to the frame for handling the cart, and at least one rack carried by the frame, the rack including shelving means for supporting at least one of the containers, and (c) securing means wherein the securing means comprises at least one pin extending generally upwardly from the rack, at least one aperture in the lip of the container dimensioned to mate with the at least one pin, at least one lug spaced forwardly of the pin and extending upwardly from the rack, and an aperture in the bottom of each of the containers dimensioned to mate with the lug.

16. The apparatus as defied in claim 15, wherein the shelving means comprises a generally vertically oriented shelf dimensioned to support two of the containers situated side-by-side thereon, and the securing means comprises a pair of spaced apart pins, each pin being dimensioned for engaging the aperture in one of the containers, the spacing of the pins and the width of the containers, the spacing of the pins and the width of the containers being selected as to enable the containers to sit side-by-side when secured to the shelf by the pins.

17. The apparatus as defined in claim 16, wherein the securing means comprises two spaced apart apertures in the lip of the containers.

18. The apparatus as defined in claim 17, wherein the securing means comprises a pair of lugs spaced apart a distance greater than the width of the containers such that one of the containers when mounted on the middle of the rack, by placing the pair of pins within the pair of apertures in the container, will rest on the rack between the pair of lugs.

19. Shopping cart and container apparatus for transporting merchandise within and to and from a store, comprising:

(a) a plurality of containers dimensioned for containing merchandise, wherein the containers comprise a bottom, a pair of opposed end walls extending from the bottom, a pair of longer side walls extending from the bottom and having a height equal to the end walls, and a lip extending laterally outwardly from upper edges of the side walls and the end walls, (b) cart means for transporting the containers, comprising an elongated wheeled base, a frame extending upwardly from the base, handle means coupled to the frame for handling the cart, and at least one rack carried by the frame, the rack including shelving means for supporting at least one of the containers; and (c) securing means associated with the rack and containers for releasably securing the containers to the shelving means, wherein the securing means comprises at least one pin extending generally upwardly form the rack, and a pair of apertures in a portion of the lip adjacent the end walls, and a pair of apertures in a portion of lip adjacent the side walls, wherein each aperture is dimensioned to mate with the at least one pin.

20. The apparatus as defined in claim 19, wherein the securing means also comprises at least one aperture in the bottom of the container, and at least one lug extending from the shelving means for mating with the bottom aperture.

21. The apparatus as defined in claim 20, wherein the securing means comprises a pair of apertures in the bottom of the container symmetrically offset form the midpoint thereof.

22. The apparatus as defined in claim 19, wherein the lip of the containers includes a handle portion situated between the pair of apertures in the opposing end walls.

23. The apparatus as defined in claim 19, wherein the container has angled corners, and wherein the portion of the lip extending outwardly from such corners has an aperture for receiving a carrying strap.

24. A shopping cart for use with a plurality of containers having at least two spaced apertures therein, comprising an elongated wheeled base, a frame extending upwardly form the base, handle means coupled to the frame for handling the cart, lower rack means coupled to the frame for supporting at least one container, upper rack means coupled to the frame and spaced above the lower rack means by a distance greater than the height of the container for supporting at least one container, and securing means carried by the upper and lower rack means for releasably securing the containers to the upper and lower rack means, respectively, wherein the securing means comprises at least one pin extending generally upwardly from each of the upper rack means and the lower rack means, dimensioned to fit within one of the apertures, and at least one lug carried by each rack means spaced forwardly of the at least one pin, dimensioned to fit within the other of the two apertures.

25. A container for use with a shopping cart including at least one rack having at least one pin projecting upwardly therefrom, comprising a bottom, a pair of opposed end walls extending form the bottom, a pair of longer side walls extending from the bottom and having a height equal to the end walls, and a lip extending laterally outwardly form upper edges of the side walls and the end walls, wherein the lip is provided with at least one aperture in a portion thereof adjacent the end walls dimensioned for mating with the pin, and at least one aperture in a portion thereof adjacent the side walls dimensioned for mating with the pin.

26. The container as defined in claim 25, wherein the portions of the lip adjacent the end walls and side walls each have a pair of apertures dimensioned to mate with the pin.

* * * * *